United States Patent [19]

Matsushima et al.

[11] Patent Number: 4,561,628
[45] Date of Patent: Dec. 31, 1985

[54] ELECTROMAGNETICALLY OPERATED HYDRAULIC ACTUATOR

[75] Inventors: Yoshiaki Matsushima; Nobutaka Chiaki; Kuniaki Kato, all of Tokyo; Toshihiko Horikiri, Funabashi, all of Japan

[73] Assignee: Tokyo Keiki Company Limited, Tokyo, Japan

[21] Appl. No.: 645,073

[22] Filed: Aug. 28, 1984

[30] Foreign Application Priority Data

Aug. 31, 1983 [JP] Japan .......................... 58-133500[U]
Aug. 31, 1983 [JP] Japan .......................... 58-133501[U]

[51] Int. Cl.[4] ............................................. F16K 31/12
[52] U.S. Cl. ................................. 251/30.01; 251/32; 251/129.15; 137/486; 137/596.16
[58] Field of Search .................... 251/30, 32, 129; 137/596.16, 625.64, 486

[56] References Cited

U.S. PATENT DOCUMENTS 4,074,699  2/1978  Stampfli ..................... 251/30 X
4,201,116  5/1980  Martin ....................... 251/30 X
4,201,362  5/1980  Nishimi et al. ............. 251/30 X
4,411,289  10/1983 Walters ....................... 251/30 X Primary Examiner—Larry Jones
Attorney, Agent, or Firm—Fleit, Jacobson, Cohn & Price

[57] ABSTRACT

An electromagnetically driven hydraulic actuator for driving an electromagnetic valve for which a larger valve operating force is required. The pilot control valve and the actuator piston are enclosed within the stationary magnetic core of the electromagnetic plunger of the actuator so that a compact driving unit is provided for driving the valve.

5 Claims, 6 Drawing Figures

ELECTROMAGNETICALLY OPERATED HYDRAULIC ACTUATOR

BACKGROUND OF THE INVENTION

This invention relates to an electromagnetically operated hydraulic actuator and, more particularly, to an electromagnetic hydraulic driving unit for driving a valve element of a hydraulic control valve, especially an electromagnetically operated hydraulic actuator for driving a actuator piston by an output hydraulic pressure of a pilot control valve driven by electromagnetic plunger means.

Recently, a strong demand for energy saving has been raised in the field of hydraulically controlled mechanical devices. Above all it is desired that power consumption of the electromagnetic valves frequently used in the hydraulic systems be reduced drastically.

To this end, a variety of pilot driven electromagnetic valves have been devised.

The pivot driven electromagnetic valve is roughly composed of a valve portion and an actuator portion for driving the valve portion. The actuator portion is generally composed of an electromagnetic plunger called "solenoid apparatus" and an actuator piston. The electromagnetic plunger employed in the typical conventional device is similar to that of the commonly employed electromagnetic valve and comprised of a solenoid coil, a stationary magnetic core and a movable magnetic core. Thus the pilot control valve and the actuator piston are arranged in one pilot body block, and both the pilot body and the electromagnetic plunger blocks are mounted to one side of the valve portion.

Therefore, the prior-art hydraulic actuator cannot be reduced in size beyond a certain lower limit. In addition, response characteristics of the prior-art actuator are lowered because the hydraulic communication between the pilot control valve and the actuator piston is established by oil conduits provided in the blocks.

SUMMARY OF THE INVENTION

In view of the foregoing, it is an object of the present invention to provide an electromagnetically operated hydraulic actuator having fast response characteristics and that can be designed with an extremely small size.

It is another object of the present invention to provide an electrically operated hydraulic actuator designed for effecting an analog operation and developing a large driving force at the actuator piston.

According to the present invention, the electromagnetically operated hydraulic actuator has an electromagnetic plunger means including a stationary magnetic core, a movable magnetic core and an excitor coil, a pilot control valve actuated by movement of the movable core, and an actuator piston driven by a pilot hydraulic pressure controlled by the operation of the pilot control valve. It is characterized in that both the pilot control valve and the actuator piston are accommodated within the interior of the stationary core, said pilot control valve is directly mechanically driven by the movable core, and in that the output hydraulic pressure of the pilot control valve is directly applied to the actuator piston.

According to a feature of the present invention, the movable core and the pilot control valve are arranged side by side on a common longitudinal axis.

According to another feature of the present invention, the movable core is arranged in a core tube connected to the stationary core and the inside of the core tube is filled with a part of oil flowing through the pilot control valve.

According to a further feature of the present invention, the electromagnetic plunger means is capable of developing an attractive force proportional to the exciting current, and the pilot control valve constitutes a pressure control valve capable of developing an output hydraulic pressure proportional to the attractive force.

According to a still further feature of the present invention, the electromagnetic plunger means acts for operating the pilot control valve in ON-OFF action, and the pilot control valve constitutes a selector valve capable of developing an output hydraulic pressure for only one of the ON and OFF states of said plunger means.

The above and other objects as well as advantageous features of the invention will become more clear from the following description taken in conjunction with the drawings.

BRIEF DESCRIPTION OF THE DRAWINGS

FIG. 2a is a schematic circuit diagram of the hydraulic circuit of the hydraulic actuator.

FIG. 3a is a schematic circuit diagram of the hydraulic circuit of the actuator.

DESCRIPTION OF THE PREFERRED EMBODIMENTS

Figure 1:
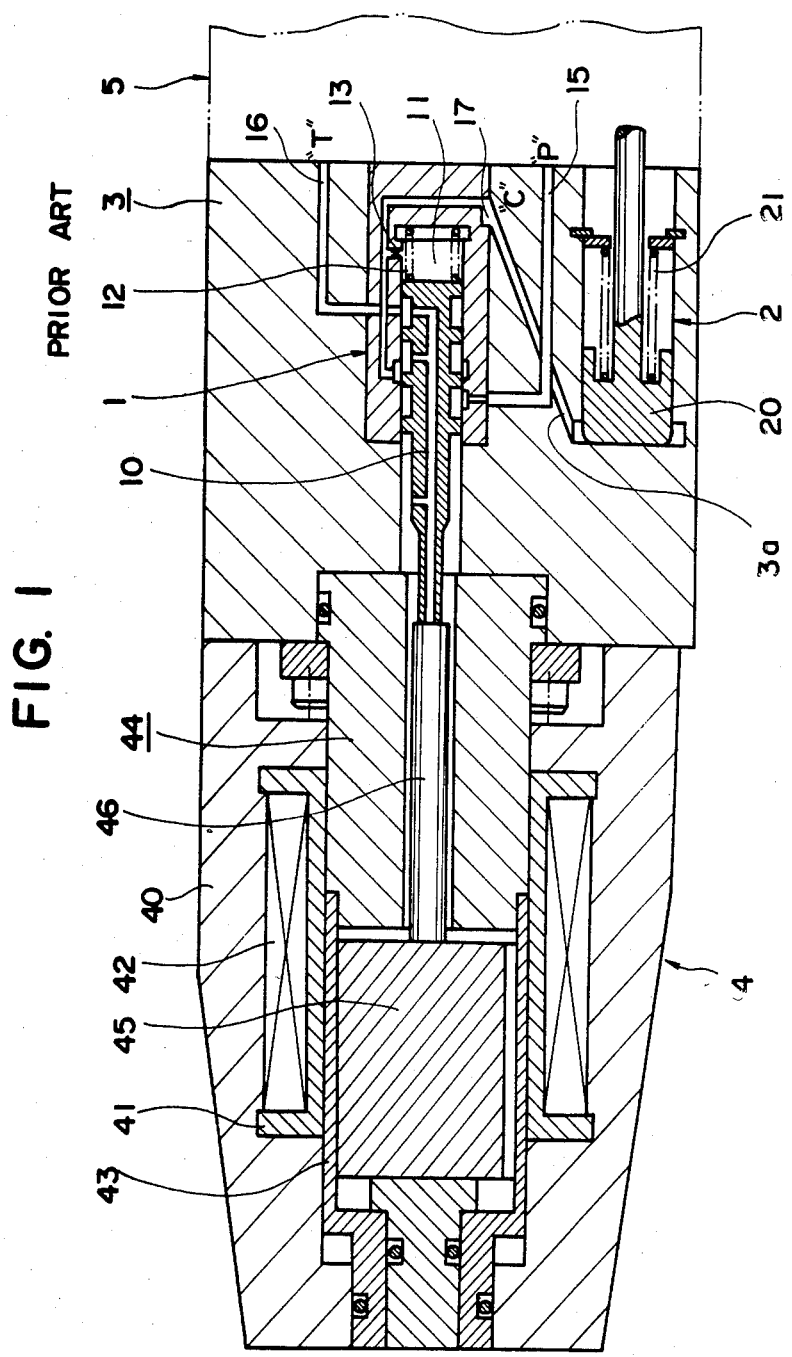
FIG. 1 is a sectional view showing an electromagnetically operated hydraulic actuator of the prior art.

The prior-art device is first explained by referring to FIG. 1.

FIG. 1 shows an example of the conventional electromagnetically operated hydraulic actuator employed for analog pilot driving of a main valve, such as flow control valve.

The electromagnetic hydraulic actuator is comprised of a pilot body 3 enclosing a pilot pressure control valve unit 1, a piston 20 of actuator 2 driven by an oil pressure supplied from the valve unit, and a return spring 21, and a solenoid plunger unit 4 adapted for driving the pressure control valve unit 1.

The solenoid plunger unit 4 is comprised of a solenoid coil 42 placed around a bobbin 41 within a housing 40, a stationary magnetic core 44 secured to a cylindrical core tube 43 and a movable member 45 formed of magnetizable material and slidably disposed within the core tube 43. A push pin 46 secured to the movable member 45 is slidably disposed within a mating throughhole in the core 44.

Upon energization of the solenoid coil 42 of the solenoid plunger unit 4, a magnetic force of attraction is caused to exist between the core 44 and the movable member 45 so that the member 45 with the push pin 46 is moved toward the right in the drawing, and a spool 10 of the pressure valve unit 1 within the pilot valve 3 is thereby shifted toward the right against the force of spring 12, in such a condition that a pilot hydraulic pressure from a pressure port or P-port 15 is partially released through a tank port or T-port 16 into a tank 16 for providing a reduced output oil pressure at a control port or C-port 17. The output hydraulic pressure, which is proportional to the input voltage or current to the solenoid coil 42, is applied to the bottom end surface of the actuator 2 through an oil conduit 3a for shifting the piston 20 toward the right in the drawing and driving the valve element, not shown, of the main valve 5.

The hydraulic pressure within the C-port is fed back through an orifice 13 to a spring chamber 11 until the spool 10 is balanced at a position corresponding to an output hydraulic pressure proportional to the input current or voltage to the solenoid coil 42.

In the prior-art electromagnetic hydraulic actuator, the pilot pressure control valve unit 1 and the actuator 2 are enclosed within the pilot body 3 for reducing the size of the device. It is however not possible with the prior-art device to reduce the size of the device beyond a certain limit because the pilot body 3 is provided separately from the solenoid unit 4.

In addition, the hydraulic pressure of the unit 1 is caused to act on the actuator 2 through oil conduit 3a, thus causing a delay in response and a resulting hindrance to increasing the control speed.

Figure 2:
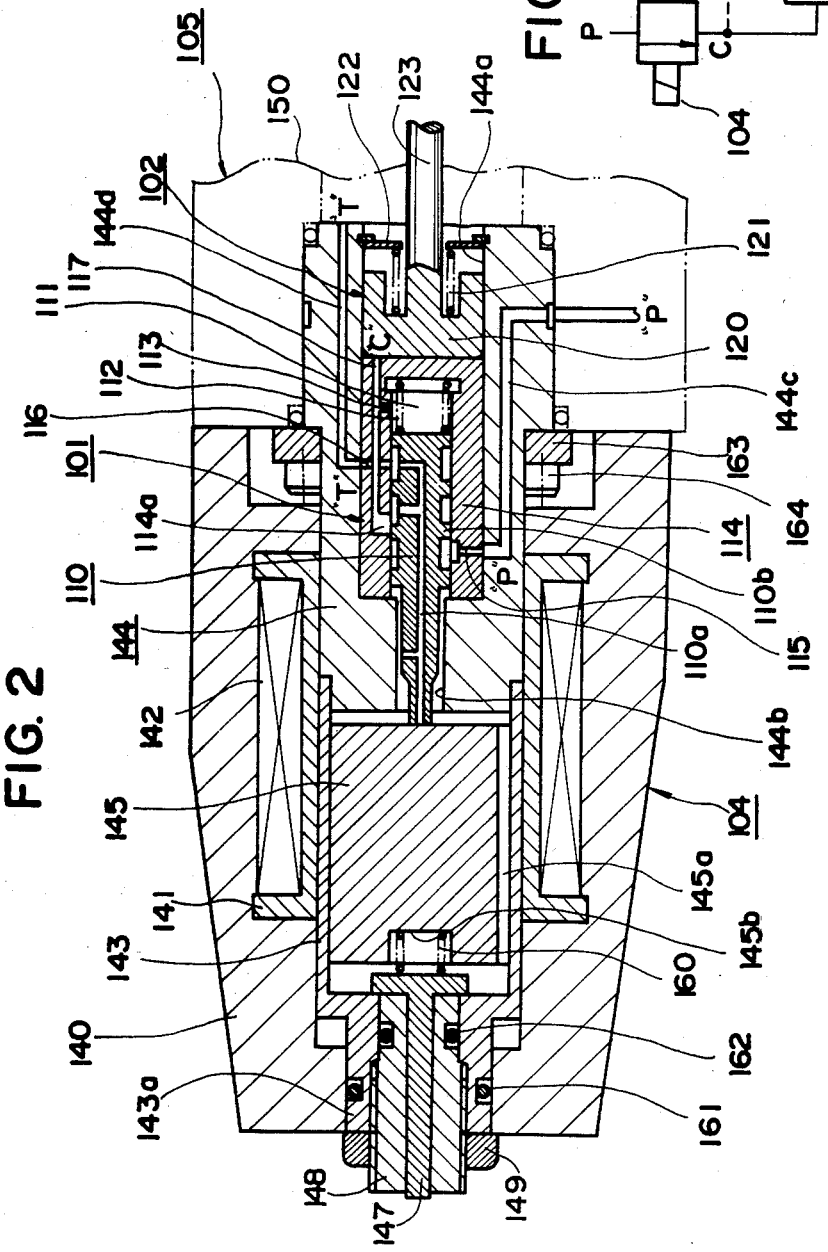
FIG. 2 is a sectional view showing an electromagnetically operated hydraulic actuator according to a first embodiment of the present invention.

In contrast thereto, the electromagnetically operated hydraulic actuator according to a first embodiment of the present invention shown in FIGS. 2 and 2a is so constructed and arranged that an actuator piston and a pilot pressure control valve unit consisting of a valve element driven by a movable member, and a stationary section provided with oil conduits for various ports and feedback orifices, are disposed within a stationary magnetic core of the solenoid plunger unit, and the output hydraulic pressure of the pilot pressure control valve is directly applied to the piston.

The first embodiment of the present invention is hereafter explained by referring to FIGS. 2 and 2a. It should be noted that certain parts of FIGS. 2 and 2a are indicated by the same numerals of FIG. 1 larger by 100, and the corresponding description is therefore omitted.

A larger diameter hollow space or chamber 144a and a lesser diameter hollow space or chamber 144b contiguous thereto are formed within the stationary core 144 of the solenoid plunger unit 104 for housing the pilot pressure control valve unit 101 and the actuator 102.

The pilot pressure control valve unit 101 is comprised of a spool 110 as a valve element and a stationary section 114 which is received within the larger diameter hollow space 144a.

The stationary section 114 is in the form of a cylinder closed at the right-hand extremity and adapted for slidably receiving the spool 110. The section 114 is formed with a P-port oil conduit 115 to which pilot oil is supplied, a T-port oil conduit 116 connected to the tank, a C-port oil conduit 117 directly connected to the actuator 102, and with an orifice 113. The oil conduits 115, 116 of the P- and T-ports are connected to oil conduits 144c, 144d, respectively formed in the stationary core 144, and also within which the oil conduit 117 of the C-port is connected via orifice 113 to a spring chamber 111.

The spool 110 is biased to travel toward the left by a spring 112 housed within the spring chamber 111 of the stationary section 114. The left-hand part of the spool 110 passes through the lesser diameter hollow space 144b of the stationary core 144 to be secured to the movable member 145.

The spool 110 has an oil conduit 110a extending along the center axis of the spool and connecting to the C-port while interconnecting the lesser diameter chamber 144b of the stationary core 144 and the T-port. The width of land 110b is less than that of groove or opening 114a of the C-port formed in the stationary section 114.

Adjacent to the stationary section 114, a piston 120 of the actuator 102 is slidably received within the larger diameter chamber 144a of the stationary core 144 and biased into an intimate contact with the stationary section 114 by a return spring 121 interposed between it and a ring stopper 122. However, when a spring is provided on the side of the load for returning the piston 120, the return spring 121 can be omitted.

A core tube 143 at the left-hand extremity of the solenoid unit 104 when seen in the drawing has a lesser diameter portion 143a the inner periphery of which is tapped for meshing with an adjustment screw 148 which is passed through a manually operated push rod 147 and which is secured with a nut 149.

A spring 160 having a larger spring force than the spring 122 is interposed between the inner end face of the push rod 147 and a recess 145b formed on the left-hand end face of the movable section 145.

The outer periphery of the movable member 145 has axial oil grooves 145a for reducing the resistance offered by fluid pressure to the moving section 145. The numerals 161, 162 designate O-ring seals.

The numerals 163, 164 designate a flange plate and a bolt, respectively, whereby the hydraulic actuator may be securely mounted to a body member 150 of the main valve 105.

The hydraulic actuator of the present embodiment operates as follows.

When the current is not supplied to the solenoid coil 142, the spool 110 is moved toward the left under the force of the spring 112. This state is shown in FIG. 2. Thus communication with the P-port is blocked, whereas the C-port connects to the T-port through oil conduit 110a in the spool 110.

When the current is supplied for energizing the solenoid coil 142, the stationary core 144 and the movable member 145 attract each other so that the movable member 145 is moved toward the right and the spool 110 is thereby also moved and caused to slide toward the right in the drawing against the force of the spring 112.

The land 110b of the spool 110 is shifted in this manner toward the right so that the P-port connects to the C-port while the cross-sectional area of the fluid passage between the C- and T-ports is reduced. Hence, the pilot hydraulic pressure from the P-port is reduced and thus a reduced oil pressure output appears at the C-port for directly acting on the actuator 102. The resulting oil pressure causes the piston 120 to be shifted toward the right in the drawing against the force of the return spring 121.

The operating force of the piston 120 causes the valve element, not shown, in the main valve 105 to be driven through a piston rod 123 for controlling, for example, the flow rate in the main circuit.

The oil pressure in the C-port also acts in the spring chamber 111 through orifice 113 for pressuring the spool 110 toward the left in a feedback operation.

Assuming that an ultimate displacement of the spool 110 is x, an ultimate displacement of the piston 120 X, an output oil pressure at the C-port Pc, an input voltage to the solenoid coil 142 V and the input current i, $$X = k_1 \cdot x = k_2 \cdot Pc = k_3 \cdot i$$

wherein $K_1$, $K_2$ and $K_3$ are constants.

It is seen from the above equation that the piston 120 is displaced by a stroke X which is proportional to the input voltage V to the solenoid coil 142 thus providing for analog proportional control.

When the current supply to the solenoid coil 142 is interrupted, the force of attraction between the movable section 145 and the stationary core 144 is reduced to nil so that the spool 110 is moved toward the left under the force of spring 112 for returning the movable member 145 away from the stationary core 144.

The spool 110 acts to block communication with the P-port while increasing the cross-sectional area of communication between the C- and T-ports.

Thus the oil in the actuator 102 is caused to flow into the tank from the C-port through oil conduit 110a in the spool 110 and the T-port, so that the piston 120 is moved toward the left under the force of the spring 121 until the state shown in FIG. 2 is again reached.

Preferably, the spool 110 and the stationary section 114 are formed of unmagnetizable material for desirably preventing desposition thereon of metal powders or impurities contained in the oil.

When the present hydraulic actuator is not used for proportional control but for ON-OFF control, an electrical voltage of any desired magnitude can be applied across the solenoid coil 142 of the solenoid unit 104 so as to effect a sufficient displacement of the spool 110 of the pilot pressure control valve unit 101.

For manual control, the adjustment screw 148 is tightened for thrusting the movable member 145 toward the right by the medium of the spring 160 for thereby displacing the spool 110. The piston 120 can thus be actuated in much the same way as when the solenoid coil 142 is energized. The adjustment screw 148 is usually employed for zero position adjustment of the spool 110.

For manual ON/OFF operation, the push pin 147 may be pushed strongly or released.

It will be appreciated from the foregoing that the push pin employed in the conventional solenoid plunger unit for pressuring the valve element of the pilot pressure control valve is not used in the hydraulic actuator according to the present first embodiment, but the pilot pressure control valve unit and the actuator piston are provided in the space formerly occupied by the push pin. In this manner, the overall size of the device is reduced, because the pilot body of the prior-art device such as that shown in FIG. 1 is dispensed with. In addition, fast response characteristics may be obtained because the output hydraulic pressure of the pilot pressure control valve unit is directly applied to the actuator piston.

It should also be noted that the electromagnetically operated hydraulic actuator is capable of developing a larger power output so that it can be used not only as a simplified actuator for a variety of analog control operations, but for electromagnetically driving relief or flow control valves requiring a larger operating force than can be supplied by an ordinary electromagnetically operated translatory type proportional valve.

The second embodiment of the present invention is hereafter explained.

Figure 3:
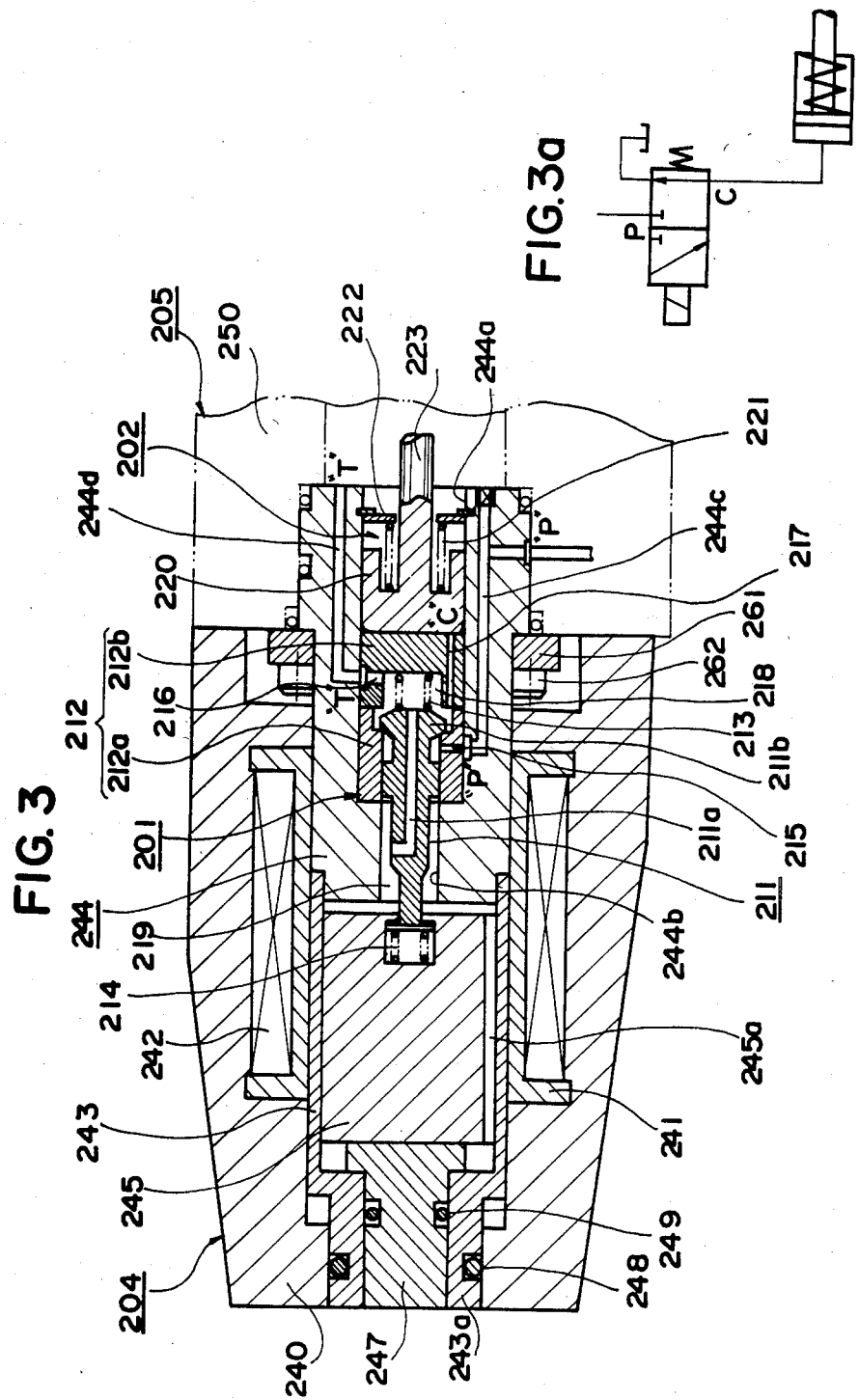
FIG. 3 is a sectional view showing a second embodiment of the present invention.

The electromagnetically operated hydraulic actuator according to the second embodiment of the present invention is so constructed and arranged that both the actuator piston and a three-way selector valve unit consisting of a valve element driven by a movable member, and a stationary section provided with oil conduits for various ports, are accommodated within the stationary core of the solenoid plunger unit and the output hydraulic pressure of the three-way selector valve unit is directly applied to the rear end face of the piston. FIGS. 3 and 3a illustrate an embodiment wherein a poppet type valve is used as three-way selector valve and FIGS. 4 and 4a a modification wherein a spool type valve is used as three-way selector valve.

Figure 4:
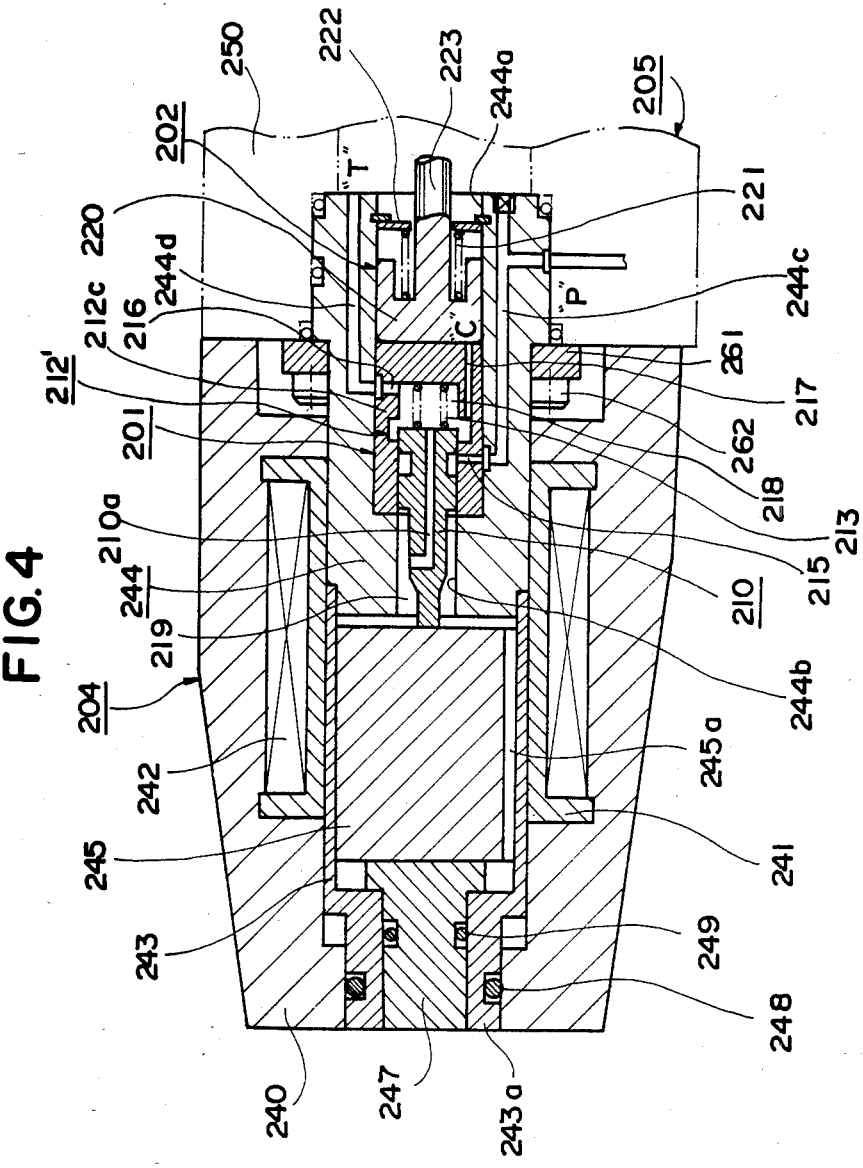
FIG. 4 is a sectional view showing a modification of the second embodiment.

In FIGS. 3 and 4, certain parts are indicated by the same numerals as those used in FIG. 1, with the addition of 200, and the corresponding description is therefore omitted.

In the embodiments shown in FIGS. 3 and 4, a three-way selector valve unit 201, a piston 220 of an actuator 202 and a return spring 221 are housed within a stationary magnetic core 244 of a solenoid unit 204.

Since these embodiments are different only slightly and solely with respect to the three-way selector valve unit 201, the following description is made chiefly on the embodiment shown in FIG. 3.

A larger-diameter chamber 244a and a lesser-diameter chamber 244b consecutive thereto are formed within the stationary core 244 of the solenoid unit 204 for housing the three-way selector valve unit 201 and the actuator 202.

The three-way selector valve 201 is comprised of a poppet 211 acting as a valve element, and a stationary section 212, which section 212 is fitted in the larger diameter chamber 244a.

The stationary section 212 is comprised of a sleeve 212a for slidably receiving a poppet 211, and a seat 212b. The sleeve 212a is provided with an oil conduit 215 of the P-port to which pilot oil is supplied, which the seat 212b is provided with an oil conduit 216 of the T-port connecting to the tank and with an oil conduit 217 of the C-port directly connected with the actuator 202. The P-port and the T-port are connected to oil conduits 244c, 244d formed in the stationary iron core 244, respectively.

The poppet 211 is biased in advance by a spring 213 so as to be shifted toward the left in the drawing. The left-hand extremity of the poppet 211 is fitted to the movable member 245 through the lesser diameter chamber 244b of the stationary core 244 and biased to be shifted toward the right by a push spring 214 having a larger spring force than the spring 213.

An oil conduit 211a is formed through the poppet 211 to permit oil to flow therethrough between a left-hand oil chamber 218 and a right-hand oil chamber 219 with movement of the poppet 211. The outer periphery of the movable member 245 is provided with longitudinal grooves 245a to permit oil communication so as to reduce the resistance offered by the fluid during movement of the section 245.

Adjacent to the stationary section 212, a piston 220 of the actuator 202 is slidably received within the larger diameter chamber 244a of the stationary core 244 and biased into intimate contact with the stationary section 212 by a return spring 221 interposed between it and a ring stopper 222. However, when a spring is provided on the side of the load for returning the piston 120, the return spring 221 can be omitted.

The numeral 247 designates a manually operated push pin to be fitted in a lesser diameter section 243a of the core tube 243 and the numerals 248, 249 designate O-ring seals. The numerals 261, 262 designate a flange plate and a bolt, respectively, for securing the present hydraulic actuator to a body member 250 of the main valve 205.

The hydraulic actuator of the present actuator operates as follows.

When the current is not supplied to the solenoid coil 242, the poppet 211 is shifted toward the left under the force of the spring 213 so that the position shown in FIG. 3 is reached. Thus the sleeve side of the section 212 is closed by a head 211b of the poppet, while the seat side of the section 212 is open, so that the C-port and T-port are in communication with each other.

When the current is supplied for energizing the solenoid coil 242, the stationary core 244 and the movable member 245 attract each other so that the movable member 245 is shifted toward the right and the poppet 211 is thereby also moved and caused to slide toward the right against the force of the spring 213.

Thus the seat side of the stationary section 212 is closed by the head 211b of the poppet 211, while the sleeve side of the section is open, so that the C-port and the P-port are in communication with each other.

The pilot oil flowing at this time from the P-port directly acts on the rear end face of the actuator piston 220 from the C-port so that the resulting oil pressure causes the piston 220 to travel toward the right in the drawing against the force of the return spring 211.

The operating force of the piston acts to drive the valve element not shown, in the main valve 205 for switching fluid routes in the main circuit.

When the current supply to the solenoid coil 242 is interrupted, the electromagnetic force of attraction between the movable member 245 and the stationary core 244 becomes nil so that the poppet 211 is moved toward the left under the force of the spring 213 for moving the movable section 245 away from the stationary core 244.

The sleeve side and the seat side of the stationary section 212 are closed and opened, respectively, by the operation of the poppet 211, the C-port being in communication with the T-port.

The oil stored near the rear end face of the actuator piston is allowed to flow in this manner into the tank through the C-port and the T-port so that the piston 220 is moved toward the left under the force of the return spring 221 until the position shown in FIG. 3 is again reached.

The sleeve 212a, the seat 212b and the poppet 211 are formed of unmagnetizable material for desirably preventing the deposition thereon of metal powders or impurities contained in the oil.

The push spring 214 is provided in order that the valve seating force produced upon energization of the solenoid with the alternating current may be reduced to a minimum possible value regardless of the attraction force of the solenoid. The push spring 214 is also effective in preventing oscillations of the poppet 211 and the movable member 245 due to fluctuations in the a.c. frequency and hence in the force of attraction in the event that, due to tolerance of the various operating parts, the movable member 245 is not attracted completely by the stationary core 244.

When direct current is supplied to the solenoid coil 242, push spring 214 can be dispensed with and the poppet 211 directly secured to the movable member 245.

The embodiment shown in FIG. 4 differs from that shown in FIG. 3 in that a spool 210 is used as valve element of the three-way selector valve unit 201 in place of the poppet 211, in that the stationary section 212' is consequently different from the sleeve 212c which is integrally formed of the sleeve 212a and the seat 212b as shown in FIG. 3, and in that the push spring 214 is dispensed with. For this reason, the parts the same as and those only slightly different from those shown in FIG. 3, are indicated by the same reference numerals and the same reference numerals with prime mark ('), respectively, and the corresponding description is therefore omitted.

The embodiment of FIG. 3 making use of a poppet type valve body has an advantage in that response speed is increased and oil leakage reduced. On the other hand, the embodiment shown in FIG. 4 making use of a spool type valve body is advantageous in that the structure can be simplified and the operational stability improved. The choice between these modifications can be made depending on the usage of the device. The poppet type and spool type devices can be interchanged by exchanging only the spool and the sleeve when the device is of such a type that the solenoid is used with direct current, or by exchanging the spool, sleeve and the movable member with push spring 214 when the device is of such a type that the solenoid is used with alternating current.

It will be appreciated from the foregoing that the push pin employed in the solenoid plunger unit for pressuring the valve body of the pilot control valve is not used in the hydraulic actuator of the present second embodiment, but the three-way selector valve unit and the actuator piston are provided within the space formerly occupied by the push pin. In this manner, the pilot body of the prior-art device such as that shown in FIG. 1 is eliminated so that the compact overall size of the device may be reduced. In addition, since the output hydraulic pressure of the three-way selector valve unit is directly applied to the actuator piston, the response time may be shorter than in the conventional device.

It should also be noted that the electromagnetically operated hydraulic actuator is capable of developing a larger power output so that it can be used not only as a simple type actuator for various ON/OFF control operations, but for pilot driving of hydraulic directional control valves or ON/OFF performance of stop or relief valves.

What is claimed is:

1. In an electromagnetically operated hydraulic actuator including an electromagnetically driven plunger means having a stationary magnetic core, a movable magnetic core and an excitor coil, a pilot control valve actuator by movement of a movable magnetic core, and an actuator piston driven by pilot hydraulic pressure controlled by the operation of the pilot control valve, the improvement wherein the stationary magnetic core includes a hollow chamber and both said pilot control valve and the actuator piston are disposed substantially completely within the hollow chamber of the stationary magnetic core; wherein said pilot control valve is directly mechanically driven by the movable magnetic core; and wherein the output hydraulic pressure of the pilot control valve is directly applied to the actuator piston.

2. The electromagnetically driven hydraulic actuator as claimed in claim 1 wherein the movable magnetic core, pilot control valve and the actuator piston are arranged side by side on a common longitudinal axis.

3. The electromagnetically operated hydraulic actuator as claimed in claim 1 wherein the movable magnetic core is arranged in a core tube connected to the stationary magnetic core and the inside of the stationary core is filled with a part of a supply of oil flowing through the pilot control valve to provide the pilot hydraulic pressure.

4. The electromagnetically operated hydraulic actuator as claimed in claim 1 wherein the electromagnetic plunger means is capable of developing an attraction force proportional to the exciting current and wherein the pilot control valve constitutes a pressure control valve capable of developing an output hydraulic pressure proportional to the attraction force.

5. The electromagnetically operated hydraulic actuator as claimed in claim 1 wherein the electromagnetic plunger means act for operating the pilot control valve in ON-OFF action, and wherein the pilot control valve is a selector valve capable of developing an output hydraulic pressure for one of the ON and OFF states of said plunger means.

* * * * *